United States Patent [19]

Stern

[11] 3,708,222
[45] Jan. 2, 1973

[54] REAR-VIEW MIRROR WITH REFLECTIVE INCLINED PRISM SURFACES

[75] Inventor: David Stern, Slough, England
[73] Assignee: Combined Optical Industries Limited
[22] Filed: May 28, 1971
[21] Appl. No.: 147,977

[30] Foreign Application Priority Data

June 2, 1970 Great Britain.....................26,530/70

[52] U.S. Cl..................................350/303, 350/211
[51] Int. Cl............................G02b 3/08, G02b 5/08
[58] Field of Search......350/293, 288, 286, 211, 292, 350/303

[56] References Cited

UNITED STATES PATENTS 3,293,982  12/1966  Appeldorn...........................350/211

FOREIGN PATENTS OR APPLICATIONS 1,133,005  11/1968  Great Britain........................350/293

Primary Examiner—David Schonberg
Assistant Examiner—Robert L. Sherman
Attorney—Shoemaker & Mattare

[57] ABSTRACT

A rear-view mirror for a vehicle, such as an automobile, which is made of plastics material and is a Fresnel mirror. The mirror comprises a multiplicity of concentric annular prisms formed on one surface of a plastics sheet, there being generally from 50 to 200 prisms per inch. The mirror can be made easily by conventional moulding techniques and can have a wider field of view and better optical properties generally than rear-view mirrors currently used in vehicles. The mirror either has no optical center or has one or more optical centers which are not at the geometrical center of the mirror.

5 Claims, 7 Drawing Figures

PATENTED JAN 2 1973

INVENTOR
DAVID STERN
BY
Shoemaker and Mattare
ATTORNEYS

REAR-VIEW MIRROR WITH REFLECTIVE INCLINED PRISM SURFACES

This invention is concerned with vehicle rear-view mirrors.

Vehicles are customarily provided with a rear-view mirror located rearwardly of the windscreen (i.e., between the driver and the windscreen) to enable the driver to see rearwardly of the vehicle without turning round. The simplest form of rear-view mirror is a plane mirror but this has many disadvantages, not the least of which is that it gives the driver only a narrow field of view. In recent years, simple convex mirrors have been used in place of plane mirrors, their prime advantage being that they provide a relatively wide field of view with a great degree of minification. However, they have the disadvantage over plane mirrors of being much more expensive to manufacture and more bulky leading to greater difficulties in mounting. In addition, whilst the optical characteristics i.e., field of view and minification, of these mirrors are an improvement over plane mirrors, there is still room for further improvement. However, these convex mirrors are generally made of glass and it would be prohibitively expensive to manufacture in glass vehicle rear-view mirrors of more complex optical properties approaching the optical ideal for the system in which they are used.

We have now found that rear-view mirrors which have improved optical properties over the simple glass convex mirrors can be made cheaply and satisfactorily in the form of plastic Fresnel mirrors. Not only are these mirrors cheaply and easily made but also they are safer in use than the conventional glass mirrors. In addition, vehicle rear-view mirrors of much more complex optical properties approximating to the optical ideal can be made easily and simply in Fresnel form.

In one aspect, the invention provides a method of making a vehicle rear-view (convex) mirror which comprises moulding a plastics material in the form of a Fresnel mirror which does not have an optical center or has one or more optical centers none of which are at the geometrical center of the mirror, and depositing a metal on the front or rear surface of the mirror to form a reflective surface.

In another aspect, the invention provides a vehicle rear-view mirror which is made of plastics material and is a Fresnel mirror which does not have an optical center or in which the optical center is outside the mirror or has one or more optical centers none of which are at the geometrical center of the mirror.

In order that the invention may be more fully understood, reference is made to the accompanying drawings in which.

Figure 1:
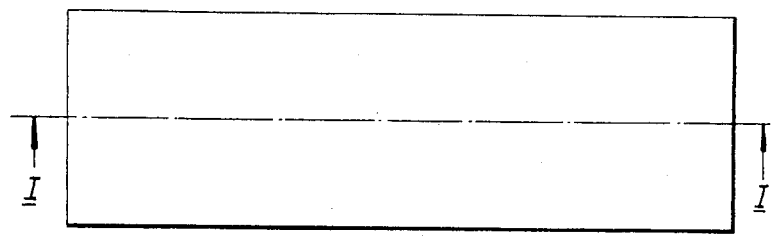
FIG. 1 is a top plan view of a conventional glass convex mirror (typical of those used heretofore, for example, in vehicle driving mirrors)
Figure 2:
FIG. 2 is a cross-section along the line I—I of FIG. 1.
Figure 4:
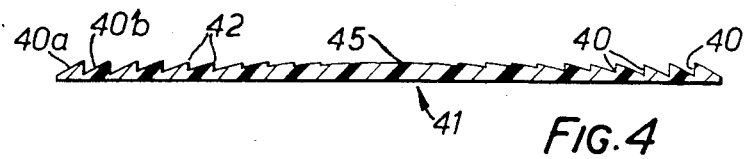
FIG. 4 is a cross-section along the line III—III of FIG. 3.
Figure 3:
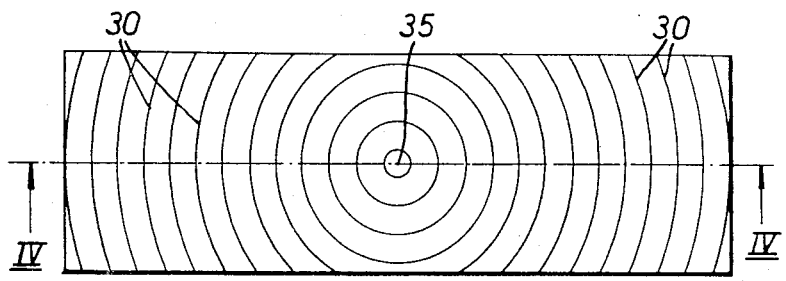
FIG. 3 is the Fresnel mirror equivalent in optical properties to the mirror of FIG. 1.

Referring now to the drawings, FIGS. 1 to 4 are given to illustrate generally the principle of construction of Fresnel mirrors. The Fresnel mirror of FIGS. 3 and 4 is substantially flat (although it could be curved) and one surface (the upper surface in both Figures) is formed with a multiplicity of prisms thereon. The side walls 40 of the prisms are generally perpendicular to the base 41 and take no part in reflecting incident light. The upper surfaces 42 of the prisms are curved and correspond in their curvature to the curvature of the appropriate portion of surface 20 in FIG. 2. Thus the curvature of the prism surfaces 40a and 40b are the same as the curvature of elements 20a and 20b, respectively. In FIG. 3, the concentric circles 30 are the contours of the leading edges 42 of the prisms. The Fresnel mirror of FIG. 4 contains a relatively small number of prisms per unit length, the upper surface of each prism being curved. However, in practice, it is difficult to form accurately curved upper surfaces on the prisms and, in order to avoid this problem, the Fresnel mirrors of this invention are made with a large number of prisms per unit length, for example more than 50, say 50 to 200, prisms per inch. With this number of prisms, the upper surface of each prism is flat and inclined at an angle corresponding to the angle of the chord of the arc of the element 20a which it represents. The loss in optical accuracy occasioned by this procedure is very slight and indeed, insignificant.

The optical center of the mirrors of FIGS. 3 and 4 is shown at 35 and 45 respectively. In both cases, it corresponds with the geometrical center of the mirror.

The mirror of FIGS. 1 and 2 may be metallised on either surface 20 or 21 and, similarly, the mirror of FIGS. 3 and 4 may be metallised on the prismed surface or on the surface 41.

Figure 5:
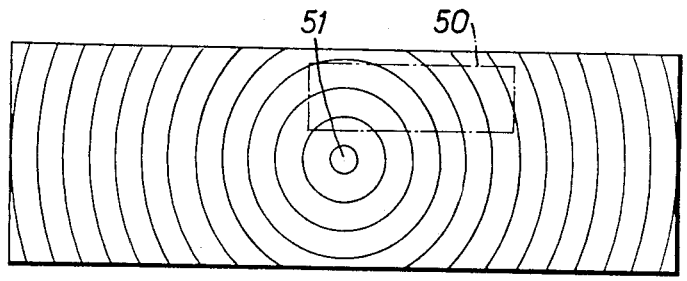
FIG. 5 is a plan view of a Fresnel mirror equivalent in optical properties to the mirror of FIG. 1.
Figure 6:
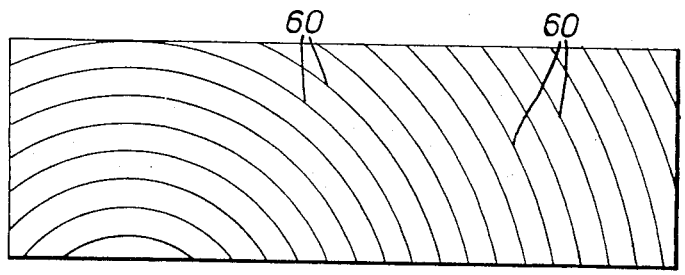
FIG. 6 is a plan view of a mirror of the invention.

Referring now to FIGS. 5 and 6, the discontinuous lines 50 in FIG. 5 indicate a portion of the mirror which is shown in FIG. 6 and which is one form of vehicle rear-view mirror of the invention. It does not contain the optical center 51 of the mirror of FIG. 5. The lines 60 are the contours of the leading edges of the prisms (not all shown). These lines are concentric.

It would be extremely expensive to produce in glass, a convex mirror having the same optical properties as the Fresnel mirror of FIG. 6. The latter can, however, very easily be made by compression or injection molding using appropriate dies. Further, the mirror of FIG. 6 is one of the simplest, optically speaking, of the mirrors of the invention. Fresnel rear-view mirrors of much more complex optical properties can be made just as simply whereas they would be almost impossible to make in glass.

Figure 7:
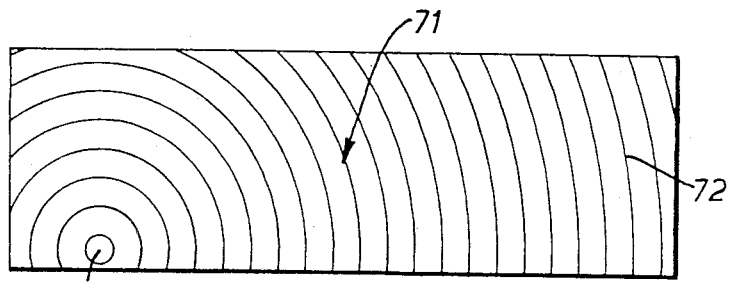
FIG. 7 is a plan view of another mirror of the invention.

FIG. 7 illustrates another form of vehicle rear-view mirror of the invention. This mirror includes an optical center (70) but this is not at the geometric center (71) of the mirror. The lines 72 are the contours of some (not all shown) of the leading edges of the prisms and are concentric.

Whilst it would be theoretically possible to vary the prism angle along the length of any prism, in practice this is extremely difficult to do with any great precision. Accordingly, in the mirrors of the invention, each prism is of constant prism angle.

In the mirrors of the invention, the optical center (if there is one on the mirror at all) is not at the geometric center of the mirror, Thus, the Fresnel equivalents of ordinary glass convex rear-view mirrors are not within the scope of this invention. The mirrors of this invention have better optical properties, in particular field of view and minification characteristics, than ordinary convex rear-view mirrors.

In selecting the precise optical properties of any Fresnel mirror of the invention, account must of course be taken of the circumstances under which it has to be used and the service it has to perform. For car rear-view mirrors, there are three important factors, namely field of view, minification and vantage point. With Fresnel mirrors of the invention, it is possible to provide a greater field of view than is given by the convex mirrors conventionally used and, generally speaking, the greater field of view the more satisfactory is the mirror. In some countries there are regulations governing the minification to be given by a rear-view mirror and, with conventional mirrors, this can present problems. However, it is relatively easy to vary the minification in a Fresnel mirror across its surface.

The vantage point of a vehicle mirror is an important consideration. The vantage point is that point, behind the reflecting surface, from which an observer has the same rearward view as the driver sees in the mirror. Preferably, this vantage point should be on the longitudinal axis of the vehicle, but with conventional plane and convex mirrors, this is rarely so. However, it is relatively easy to make a Fresnel mirror which, when mounted in a vehicle, gives a vantage point on or close to the longitudinal axis of the vehicle.

As stated above, the Fresnel vehicle rear-view mirrors of this invention may have relatively simple or complex optical properties. In their simplest forms, they may correspond to a portion of, for example, a conventional hemispherical or cylindrical mirror and in their more complex forms, they may correspond to, for example, a conventional generally convex mirror having spherical and aspherical and cylindrical reflecting surfaces.

The precise optical properties will be chosen to suit the particular conditions under which the mirror is to be used, and the construction of a Fresnel mirror having the desired optical properties will be a routine matter to one skilled in the art.

The mirrors of the invention may be flat or they may be curved. In use, they may be mounted directly onto the windscreen of a vehicle using, for example, a suitable adhesive, or they may be positioned on a support member attached to the frame of the vehicle. Preferably, the prismed surface of the mirror forms the rear reflecting surface, i.e., is closest to the windscreen. It is to be understood that as used herein, the term vehicle includes not only land vehicles but also sea and air craft.

Not only are the rear-view mirrors of the invention more easily and cheaply made than glass convex mirrors, they are also more easily mounted for use because they are much lighter in weight.

I claim:

1. A rear-view mirror for an automobile, comprising a sheet of plastics material having a front surface and a rear surface, a multiplicity of arcuate concentric prisms on one of said surfaces, each said prism having a flat outer surface inclined upwardly at an angle to said one surface toward the optical axis of the prisms and a side edge extending perpendicularly to said one surface, a layer of light reflecting material on said inclined prism surfaces, said mirror having a geometric center spaced from the center of the arcuate concentric prisms.

2. A rear-view mirror as in claim 1, wherein the optical center of the prisms is outside said mirror.

3. A rear-view mirror as in claim 1, wherein the mirror is substantially flat.

4. A mirror according to claim 1 which is made of a plastics material selected from polycarbonate and polymethylmethacrylate.

5. A mirror according to claim 1 wherein there are from 50 to 200 annular concentric prisms per linear inch.

* * * * *